Jan. 28, 1958   F. R. ERICSON   2,821,094
SHAFT ALIGNMENT MECHANISM
Filed Nov. 25, 1955

Inventor:
Franklin R. Ericson
by　*Kiess*
His Attorney

United States Patent Office 2,821,094
Patented Jan. 28, 1958

2,821,094

SHAFT ALIGNMENT MECHANISM

Franklin R. Ericson, Leominster, Mass., assignor to General Electric Company, a corporation of New York Application November 25, 1955, Serial No. 549,011

4 Claims. (Cl. 74—606)

This invention relates to mechanism for adjusting the position of two interconnected machines relative to each other, particularly to an improved arrangement for horizontally adjusting an elastic fluid turbine assembly relative to a reduction gear assembly so that the gear and turbine shafts are accurately aligned.

In installations where the turbine units are fast coupled to speed reducing gearing, it is necessary that the end of the turbine adjacent the gearing be fixed in a predetermined axial alignment with respect to the gearing. It has been common practice to horizontally line up the turbine with the reduction gear assembly by fitting chocks to a vertical key construction under the packing box between the lower halves of the turbine and the gear casings. These chocks are located in a congested area. This makes horizontal adjustment of the turbine casing relatively difficult due to the inaccessibility of the chocks when adjustment is required. In such cases it is necessary to completely remove the turbine shaft packing box surrounding the portion of the shaft adjacent the gear housing to adjust the horizontal position of the turbine housing relative to the gear housing.

Accordingly, it is an object of this invention to obtain and maintain horizontal alignment of the turbine and gear housings without requiring disassembly of the shaft packing box, saving effort and time, and insuring more accurate alignment of the gear and turbine shafts during reassembly.

A further object is to provide an adjustment mechanism which is simple in design and which can be quickly and efficiently operated with a minimum of effort.

Figure 1:
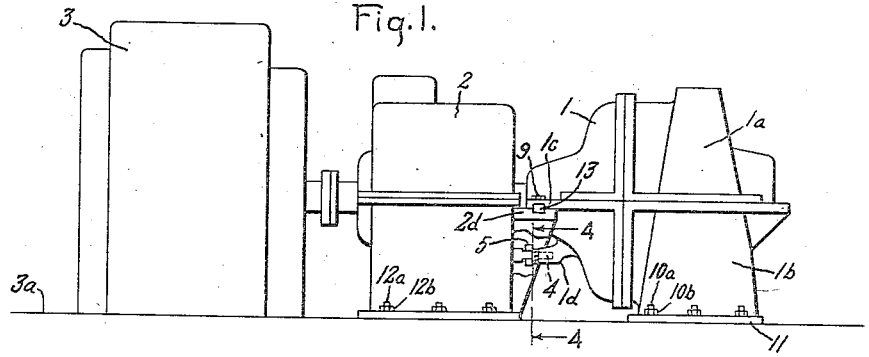
Figure 2:
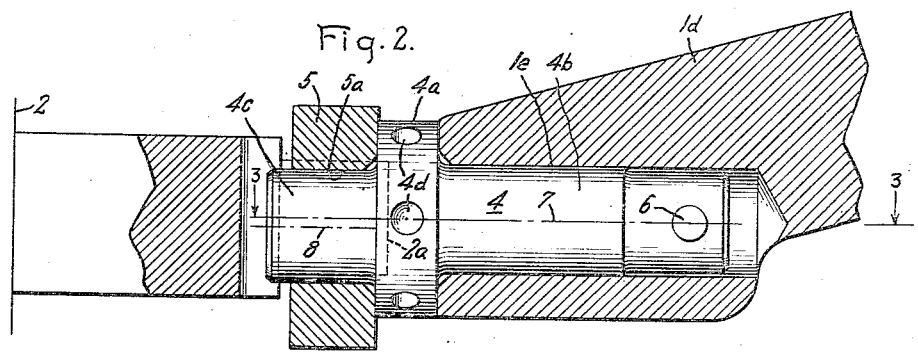
Figure 3:
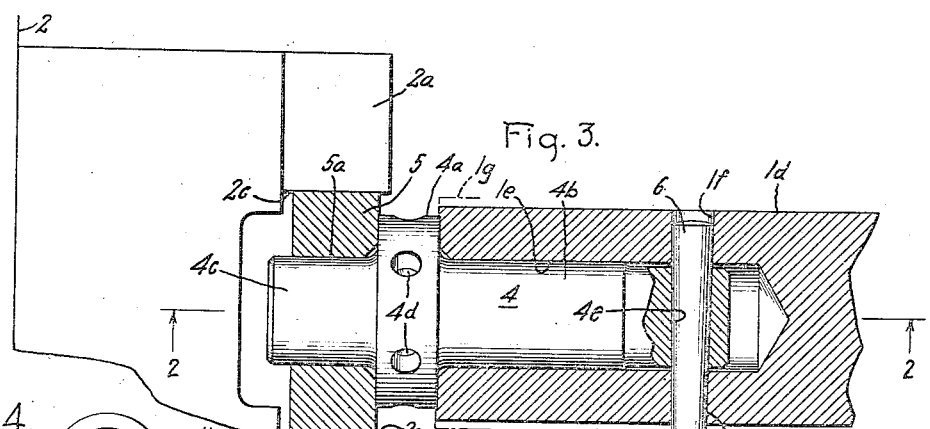
Figure 4:
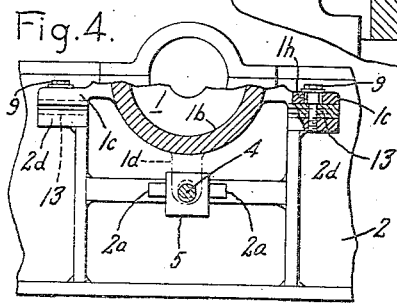

Other objects and advantages will become apparent from the following description taken in connection with the accompanying drawings, in which Fig. 1 is an assembly view showing an interconnected turbine, gear casing, and generator, Fig. 2 is an enlarged side view partially in section of the alignment mechanism taken along lines 2—2 of Fig. 3, Fig. 3 is a sectional view taken along lines 3—3 of Fig. 2, and Fig. 4 is a partial sectional view taken along lines 4—4 of Fig. 1.

Generally stated, this invention is practiced by providing a mechanism for aligning the turbine shaft relative to the gear shaft in the horizontal plane consisting of an eccentric pin whose ends are disposed in a slidable key member in the gear housing and a bore in the turbine casing respectively. The gear casing is fixed to the foundation and the turbine casing is horizontally adjusted by rotating the pin about an eccentric end portion. The turbine is prevented from being raised vertically by permitting the key member to slide in a vertical direction.

Fig. 1 illustrates a turbine 1, reduction gear casing 2, and generator 3. The turbine 1 comprises upper and lower halves 1a, 1b and defines feet portions 1c which extend out from lower half 1b. Feet 1c are slidably supported on feet 2d of gear casing 2 (Fig. 4) through the medium of radial keys 13 to permit movement of the turbine casing in a horizontal direction due to differential expansion between the turbine and gear casings. This prevents cramping, overstressing of casings and possible misalignment of the shafts in a horizontal plane. As can be appreciated from the drawing, this adjustment can be readily accomplished during assembly of the components on the foundation 3a.

Actually, the gear housing 2 is first firmly secured to the common foundation 3a by studs 12a and nuts 12b while the turbine is left free to be horizontally moved to line up the turbine and gear shafts before they are coupled together. To permit this limited movement there is a clearance space provided between the bolts 9, studs 10a and turbine arms 1c and turbine base 11 respectively, and the bolts 9 and nuts 10b are not tightened down until the shafts are aligned. The bolt 9 is a shoulder bolt and the clearance 1h provided between the turbine casing and bolt permits the turbine casing to expand in a horizontal direction. The height of the shoulder portion of the bolt is slightly larger than the width of feet 1c to permit horizontal movement.

Turbine 1 further defines an arm portion 1d extending outward from the casing below the centerline of the turbine shaft (not shown). The arm 1d defines a cylindrical bore 1e which receives an eccentric pin 4. The pin 4 comprises end portion 4b inserted in the bore 1e, shoulder portion 4a, and an eccentrically disposed end portion 4c. The centerline of the bore 1e and end portion 4b is indicated at 7 and the centerline of eccentric portion 4c as shown at 8 (see Fig. 2). The end portion 4c is supported by the gear housing 2 by an assembly to be described hereinafter.

The gear casing 2 has arm portions 2a between which is defined a vertical keyway 2c. Slidably fitted in the keyway 2c is a key member 5, which has a cylindrical opening 5a adapted to receive the end portion 4c of pin 4. The key member 5 slides vertically in the keyway 2c to prevent the turbine from cramping due to differential expansion. It primarily prevents vertical movement of the turbine casing when the pin 4 is rotated. The shoulder 4a serves as a spacer between the turbine and key member 5 and further defines a plurality of openings 4d. These openings are designed to receive a spanner wrench (not shown) for rotating the eccentric pin 4. After the casings are lined up, the pin 4 is prevented from rotating by a tapered pin 6 which extends through aligned openings 1f and 4e in the turbine arm 1d and pin 4 respectively. These holes 1f, 4e are drilled and reamed after the gear housing 2 and turbine 1 have been completely aligned.

The horizontal adjustment of the gear casing relative to the turbine is accomplished in the following manner.

A suitable tool such as a spanner wrench (not shown), is inserted in the openings 4d to rotate the pin 4 about the centerline 8 of the end portion 4c disposed in keyway 5a. This rotation of the pin 4 (since the gear casing is fixed and the turbine casing is free to move) moves the turbine casing horizontally relative to the gear casing within the approximate limits indicated by the dotted lines 1g in Fig. 3. Any accompanying vertical movement of the turbine casing is prevented by the sliding movement of key member 5 in the vertical direction in keyway 2c. After the shafts of the turbine and gear assembly are aligned, the holes 1f, 4e are drilled and reamed in the turbine arm 1d and pin 4b respectively, and the tapered pin 6 is driven in to lock pin 4. The turbine casing is then firmly secured to its base 11 by tightening nuts 10b.

Thus it will be seen that a simple mechanism is provided to horizontally shift the turbine casing relative to the gear casing so that their shafts are in proper alignment. This is accomplished by providing a pin having eccentrically disposed end portions one of which is disposed in the turbine casing and the other in the gear casing. Rotation of the pin provides for horizontal adjustment of the turbine casing relative to the gear casing. Vertical movement of the turbine casing is prevented by permitting the key 5 to move vertically in keyway 2c.

While a single embodiment of the invention has been described in detail herein, it will be obvious to those skilled in the art that changes and substitutions of equivalents might be made. For example, the gear casing could be free to move while the turbine casing is firmly secured to the base. Or, the slidable key could be disposed in the turbine arm and the cylindrical bore defined by the gear casing. It is also obvious that this arrangement could be used to align two adjacent machines in whatever plane desired.

It is, of course, desired to cover by the appended claims all such modifications as fall within the true spirit and scope of the invention.

What I claim as new and desire to secure by Letters Patent of the United States is:

1. In combination, a first machine having a first rotatable shaft, a second machine having a second rotatable shaft, means securing the first machine against movement relative to a foundation common to said machines, and means for aligning said shafts in a first plane parallel to the foundation and comprising a keyway defined by a first portion of one of said machines, said keyway extending in a second plane normal to said first plane, a key member slidably disposed in said keyway and defining a cylindrical opening with its axis disposed parallel to said first plane, a portion of said other machine adjacent said first machine defining a cylindrical bore having an axis parallel to said first plane but eccentrically located relative to said cylindrical opening, a pin member with eccentrically disposed cylindrical end portions located in said cylindrical bore and key opening respectively, the pin member having a radially extending portion disposed between said first and second machine portions and adapted to be engaged by means for rotatably adjusting the pin to alter the relative position of said first and second shafts in said first plane, and means for locking the pin against rotation after the adjustment has been made.

2. Mechanism for shifting a machine mounted on a common foundation adjacent another machine in a first plane parallel to said foundation comprising means securing one of the machines relative to said foundation, one of the machines having a portion defining a keyway extending in a second plane normal to said first plane, a key member slidably disposed in said keyway in said second plane and defining a cylindrical opening having an axis parallel to said first plane, said other machine defining a cylindrical bore the axis of which is parallel to said first plane, the bore and key opening being eccentrically disposed, and a pin having eccentrically disposed cylindrical end portions disposed in the bore and key opening, whereby turning of the pin effects adjustment of the position of one machine relative to the other in said first plane.

3. Mechanism for shifting a turbine housing relative to a gear casing in a first plane comprising means securing the gear casing against movement, a turbine housing arm portion defining a cylindrical bore, the gear casing defining a keyway extending in a second plane normal to said first plane, a key slidably disposed in said keyway and defining a cylindrical opening, the bore and cylindrical opening being eccentrically disposed, a pin having eccentrically disposed cylindrical end portions disposed in the bore and key opening, and means for preventing the pin from rotating after the turbine has been aligned relative to the gear casing in said first plane.

4. In combination, a turbine having a first rotatable shaft, a gear casing having a second rotatable shaft adapted to be coupled to said first shaft, means for horizontally aligning said shafts comprising means securing said gear casing to a horizontal foundation against movement relative to the turbine, a turbine housing arm portion extending out from the turbine and defining a cylindrical bore extending in a horizontal direction, said gear casing defining a keyway adjacent said arm and extending in a vertical direction, a key slidably disposed in said keyway and defining a horizontally extending cylindrical opening, the bore and cylindrical opening being eccentrically disposed, a pin having eccentrically disposed cylindrical end portions disposed in the bore and key opening, the pin having a flange portion located between the turbine and gear housings and adapted to be engaged by means for rotatably adjusting said pin to move the turbine in a horizontal direction relative to said gear casing and means for preventing the pin from rotating after the turbine and gear shafts have been horizontally aligned, said last means comprising a pin extending through aligned transverse openings defined by said pin and turbine arm.

No references cited.